(12) United States Patent
Wood et al.

(10) Patent No.: US 6,944,761 B2
(45) Date of Patent: Sep. 13, 2005

(54) LOG-ON SERVICE PROVIDING CREDENTIAL LEVEL CHANGE WITHOUT LOSS OF SESSION CONTINUITY

(75) Inventors: David L. Wood, Louisville, CO (US);
Paul Weschler, Broomfield, CO (US);
Derk Norton, Louisville, CO (US);
Chris Ferris, Whitinsville, MA (US);
Yvonne Wilson, Mountain View, CA (US); William R. Soley, Campbell, CA (US)

(73) Assignee: Sun Microsystems, Inc., Sunnyvale, CA (US)

( * ) Notice: Subject to any disclaimer, the term of this patent is extended or adjusted under 35 U.S.C. 154(b) by 211 days.

(21) Appl. No.: 10/643,813

(22) Filed: Aug. 19, 2003

(65) Prior Publication Data

US 2004/0210771 A1 Oct. 21, 2004

Related U.S. Application Data

(62) Division of application No. 09/368,506, filed on Aug. 5, 1999, now Pat. No. 6,609,198.

(51) Int. Cl.[7] .............................................. G06F 11/30
(52) U.S. Cl. ...................... 713/155; 713/182; 713/200; 713/201; 713/169
(58) Field of Search ................................. 713/155, 162, 713/169, 200, 201

(56) References Cited

U.S. PATENT DOCUMENTS

| | | | |
|---|---|---|---|
| 5,826,014 A | 10/1998 | Coley et al. | 395/187.01 |
| 5,875,296 A | 2/1999 | Shi et al. | 395/188.01 |

FOREIGN PATENT DOCUMENTS

| | | |
|---|---|---|
| EP | 0 465 016 A | 6/1992 |
| EP | 0 849 680 A | 6/1998 |
| WO | 96/42041 | 12/1996 |
| WO | 98/25373 | 6/1998 |
| WO | 98/57247 | 12/1998 |

OTHER PUBLICATIONS

"X/Open Single Sign–On Service (XSSO)—Pluggable Authentication Modules," *Open Group Preliminary Specification*, P702 ISBN 1–85912–144–6, Jun. 1997, 140 pages.

"Kerberos: An Authentication Service for Computer Networks," USC/ISI Technical Report No. ISI/RS–94–399, 1994, *IEEE Communications Magazine*, vol. 32, No. 9, pp. 33–38, Sep. 1994, http://www.nii.isi.edu/publications/kerberos–neuman–tso.html, 12 pages.

"A White Paper on Authentication and Access Management Issues in Cross–organizational Use of Networked Information Resources," Clifford Lynch, editor, *Coalition for Networked Information*, Apr. 14, 1998, http://www.cni.org/projects/authentication/authenication–wp.html, 28 pages.

(Continued)

*Primary Examiner*—Thomas R. Peeso
(74) *Attorney, Agent, or Firm*—Zagorin O'Brien Graham LLP

(57) ABSTRACT

A security architecture has been developed in which a single sign-on is provided for multiple information resources. Rather than specifying a single authentication scheme for all information resources, the security architecture associates trust-level requirements with information resources. Authentication schemes (e.g., those based on passwords, certificates, biometric techniques, smart cards, etc.) are employed depending on the trust-level requirement(s) of an information resource (or information resources) to be accessed. Once credentials have been obtained for an entity and the entity has been authenticated to a given trust level, access is granted, without the need for further credentials and authentication, to information resources for which the authenticated trust level is sufficient.

26 Claims, 7 Drawing Sheets

OTHER PUBLICATIONS

"AutoSecure SSO, The single-point information security solution for heterogeneous environments," *PLATINUM Technology Brochure*, downloaded May 3, 1999, http://www.platinum.com/products/brochure/sm/autosso/ssobroch.htm, 5 pages.

D. Davis and R. Swick, "Workstation Services and Kerberos Authentication at Project Athena," *MIT Laboratory for Computer Science Technical Memorandum* #424, Mar. 17, 1989, 12 pages.

Don Davis, "Kerberos Plus RSA for World Wide Web Security," *Proc. 1st USENIX Workshop on Electronic Commerce*, NYC, Aug. 3, 1995, 4 pages.

D. Geer and D. Davis, "Token–Mediated Certification and Electronic Commerce," *Proc. 2nd USENIX Workshop on Electronic Commerce*, Oakland, CA, Nov. 1996, 11 pages.

"Enterprise Single Sign–On, Definitions and Approaches," *PLATINUM Technology White Paper*, downloaded May 3, 1999, http://www.platinum.com/products/wp/wp_sso.htm, 7 pages.

"How Does PATROL CGI Server Work?" BMC Software, Houston, TX, downloaded Apr. 20, 1999, http://www.bmc.com/cgiserver/info/how_itworks.html, 3 pages.

"How to Develop a Network Security Policy, An Overview of Internetworking Site Security," *Sun Microsystems White Paper*, Palo Alto, CA, downloaded Apr. 20, 1999, http://www.sun.com/security/sec.policy.wp.html, 23 pages.

"Kerberos and 3rd Party Authentication," Version 2.1—Mar. 26, 1994, *Security Dynamics White Paper*, Bedford, MA http://www.securitydynamics.com/products/whitepapers/kerberos.html, 8 pages.

*Mastering Security on the Internet for Competitive Advantage*, Sun Microsystems, Palo Alto, CA, Aug. 1997, 47 pages.

Ari Medvinsky et al., "Public Key Utilizing Tickets for Application Servers (PKTAPP)," *Cybersafe Corporation INTERNET–DRAFT*, Common Authentication Technology Working Group, Issaquah, WA, Mar. 1998, http://www.ietf.org/internet-drafts/draft-ietf-cat-pktapp-01.txt, 6 pages.

"Optimizing Internet/Intranet Services with PATROL CGI Server," *BMC Software White Paper*, Houston, TX, downloaded Apr. 20, 1999, http://www.bmc.com/cgiserver/info/cgawp.html, 15 pages.

"PLATINUM AutoSecure Signal Sign On (AutoSecure SSO)," *PLATINUM Technology Fact Sheet*, downloaded May 3, 1999, http://www.platinum.com/products/factsht/assso_fs.htm. 3 pages.

"Products Application Server," *Art Technology Group Product Overview Developer Workbench*, downloaded Apr. 21, 1999, http://www.atg.com/products/das/das_main.html-?didframe=true, 4 pages.

"TrustBroker™ Security Server, The Only Multi–Mechanism Authentication Server," CyberSafe Corporation, Issaquah, WA, 1999, 2 pages.

Hubbard, S. D. et al., "Firewalling the Net" BT Technology Journal, BT Laboratories, GB, vol. 15, No. 2, Apr. 1997, XP000703560, ISSN: 1358–3948, pp. 94–106.

Doty, Ted, "A Firewall Overview", ConneXions, vol. 9, No. 7, Jul. 1, 1995, XP000564023, ISSN: 0894–5926, pp. 20–23.

W. Stallings, "Authentication Applications", *Cryptography and Network Security*, Chapter 11, pp. 323–340, 1998 Prentice–Hall, US XP002161792.

R. Ganesan, "Yaksha: Augmenting Kerberos with Public Key Cryptography", *Proceedings of the Symposium on Network and Distributed System Security*, pp. 132–143, Feb. 16, 1995, IEEE, XP002148503.

W. Stallings, "IPV6: The New Internet Protocol", *IEEE Communications Magazine*, IEEE Service Center, Piscataway, N.J., US, vol. 34, No. 7, Jul. 1, 1996, pp. 96–108 XP000623747, ISSN: 0163–6804.

LOG-ON SERVICE PROVIDING CREDENTIAL LEVEL CHANGE WITHOUT LOSS OF SESSION CONTINUITY

CROSS-REFERENCE TO RELATED APPLICATION

This application is a divisional of U.S. patent application Ser. No. 09/368,506, filed Aug. 5, 1999, now U.S. Pat. No. 6,609,198 entitled "Log-on Service providing credential level change without Loss of Session Continuity," naming as inventors David L. Wood, Paul Weschler, Derk Norton, Chris Ferris, Yvonne Wilson and William R. Soley, which application is incorporated herein by reference in its entirety.

BACKGROUND

1. Field of the Invention

The invention relates to information security, and more particularly, to systems and method for improving the security of information transactions over networks.

2. Description of the Related Art

The internet has become an important medium for information services and electronic commerce. As the internet has been commercialized, organizations initially established their presence in cyberspace by making information (typically static, non-sensitive promotional information) available on resources well removed from the operational infrastructure of the organization. Security issues were often addressed by isolating publicly accessible resources (e.g., web servers) from more sensitive assets using firewall techniques. As long as the publicly accessible information and resources were relatively non-sensitive and user interactions with such information and resources was not mission critical, relatively simple firewall techniques were adequate. Though information and resources outside the firewall were at risk, the risk could generally be limited to non-proprietary information that was easily replaceable if compromised. Proprietary information and systems critical to day-to-day operations were sheltered behind the firewall and information flows across the firewall were filtered to exclude all but the comparatively non-threatening services such as electronic mail.

However, as the internet has become more pervasive, and as the sophistication of tools and techniques has increased, several aspects of the security environment have changed dramatically. First, businesses have recognized the power of information transactions that more tightly couple to operational data systems, such as order processing, inventory, payment systems, etc. Such transactions include electronic commerce with direct purchasers or consumers (e.g., browsing, selecting and purchasing of books by members of the public from an on-line bookseller) as well as supply chain and/or business partner interactions (e.g., automated just-in-time inventory management, customer-specific pricing, availability and order status information, etc.). Commercially relevant transactions increasingly require information flows to and from secure operational systems. Second, even information-only services are increasingly mission-critical to their providers. Corporate image can be adversely affected by unavailability of, or degradation access to, otherwise non-sensitive information such as customer support information, product upgrades, or marketing and product information. Because many businesses rely heavily on such facilities, both unauthorized modification and denial of service represent an increasing threat.

Individual information service or transaction system typically exhibit differing security requirements. While it is possible to field individualized security solutions for each information service or transaction system, individualized solutions make it difficult to maintain a uniform security policy across a set of applications or resources. Furthermore, individualized solutions tend to foster incompatible security islands within what would ideally be presented to consumers or business partners as a single, integrated enterprise. For example, a user that has already been authenticated for access to an order processing system may unnecessarily be re-authenticated when accessing an order status system. Worse still, a set of individualized solutions is typically only as good as the weakest solution. A weak solution may allow an enterprise to be compromised through a low security entry point.

Another problem with individualized solutions is a veritable explosion in the number of access controls confronting a user. As more and more business is conducted using computer systems, users are confronted with multiple identifiers and passwords for various systems, resources or levels of access. Administrators are faced with the huge problem of issuing, tracking and revoking the identifiers associated with their users. As the "user" community grows to include vendors, customers, potential customers, consultants and others in addition to employees, a huge "id explosion" faces administrators. Furthermore, as individual users are themselves confronted with large numbers of identifiers and passwords, adherence to organizational security policies such as password restrictions and requirements (e.g., length, character and/or case complexity, robustness to dictionary or easily-ascertainable information attack, frequency of update, etc.) may be reduced. As users acquire more passwords-some individuals may have 50 or more—they cannot help but write down or create easy-to-remember, and easy-to-compromise, passwords.

SUMMARY

Accordingly, a security architecture has been developed in which a single sign-on is provided for multiple information resources. Rather than specifying a single authentication scheme for all information resources, security architectures in accordance with some embodiments of the present invention associate trust-level requirements with information resources. Authentication schemes (e.g., those based on passwords, certificates, biometric techniques, smart cards, etc.) are associated with trust levels and environmental parameters. In one configuration, a log-on service obtains credentials for an entity commensurate with the trust-level requirement(s) of an information resource (or information resources) to be accessed and with environment parameters that affect the sufficiency of a given credential type. Once credentials have been obtained for an entity and have been authenticated to a given trust level, access is granted, without the need for further credentials and authentication, to information resources for which the trust level is sufficient given a current session environment. Credential insufficiency may be remedied by a session continuity preserving credential upgrade.

A novel aspect of the log-on service is an ability to upgrade credentials for a given session. This capability is particularly advantageous in the context of a single, enterprise-wide log-on. An entity (e.g., a user or an application) may initially log-on with a credential suitable for one or more resources in an initial resource set, but then require access to resource requiring authentication at higher trust level. In such case, the log-on service allows additional credentials to be provided to authenticate at the higher trust level. Similarly, credentials may be downgraded in some configurations when no longer required. The log-on service allows upgrading and/or downgrading without loss of session continuity (i.e., without loss of identity mappings, authorizations, permissions, and environmental variables). By allowing upgrades and/or downgrades, the log-on service allows an entity to tailor its credentialing to current access requirements. Furthermore, by allowing upgrades and downgrades, the log-on service allows enterprise-wide security policies to be implemented in which an overcredentialled log-on state (e.g., as root) is not required or need not be maintained.

In one embodiment in accordance with the present invention, a method of providing a persistent session in a networked information environment includes associating a unique session identifier with a set of access requests originating from a client entity and maintaining the unique session identifier across a credential level change. In one variation, the method further includes issuing one or more cryptographically secured session tokens to the client entity and supplying at least one of the cryptographically secured session tokens with each of the access requests. Each of the cryptographically secured session tokens encodes the unique session identifier.

In another embodiment in accordance with the present invention, a method for providing credential level change in a security architecture includes obtaining a first credential for a client entity and authenticating the client entity thereby, accessing a first of plural information resources, and if the client entity is sufficiently authenticated for access to a second of the information resources, accessing the second information resource. Otherwise, a second credential for the client entity is obtained and the client entity is authenticated thereby. The second credential sufficiently authenticates the client entity for access to the second information resource and thereafter the second information resource is accessed. The accesses to first and second information resources are performed within a persistent session context and the second credential obtaining and client entity authenticating are performed without loss of session continuity.

In an embodiment in accordance with the present invention for use in a networked information environment having plural information resources with potentially differing authentication requirements, a method of providing a sign-on common to the information resources includes authenticating a client entity using a first credential, issuing a session token corresponding to a session of the client entity, allowing access using the session token to first and second, but not a third, of the information resources, upgrading the session token after authenticating with a second credential, and thereafter, without loss of session continuity, allowing access using the upgraded session token to the first, second and third information resources.

In another embodiment in accordance with the present invention for use in a networked information environment having plural authentication levels for access to one or more information resources, a method for providing a persistent session interface thereto includes authenticating an entity to a first authentication level and associating a unique session identifier with the entity, after association of the unique session identifier, authenticating the entity to a second authentication level and maintaining the association of the unique session identifier with the entity; and thereafter allowing access, using the unique session identifier, to the information resources at the second authentication level.

In still yet another embodiment in accordance with the present invention, a secure information system includes plural information resources hosted on one or more servers coupled via a communication network to a client entity and a log-on service common to the plural information resources. The information resources have individualized authentication requirements. The common log-on service obtains a first credential for the client entity, authenticates the client entity thereby, and establishes a session having a first authentication level commensurate with authentication requirements of at least one of the information resources. In response to an access request requiring a second authentication level higher than the first, the common log-on service obtains a second credential for the client entity, authenticates the client entity thereby, and upgrades the session to the second authentication level without loss of session continuity.

In still yet another embodiment in accordance with the present invention, an access management system provides a single sign-on for sessions that potentially include access to plural information resources having differing security requirements and includes (1) a gatekeeper with an authorization interface for determining whether a first authenticated credential associated with client entity and session is consistent with a trust level requirement for a target information resource and, if so, proxying an access thereto and (2) means responsive to the gatekeeper for upgrading the session. The session upgrading means upgrading the session by obtaining and authenticating a second credential to allow access to the target information resource if the first authenticated credential is inconsistent with the trust level requirement. The session upgrade means maintains session continuity across credential upgrades.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
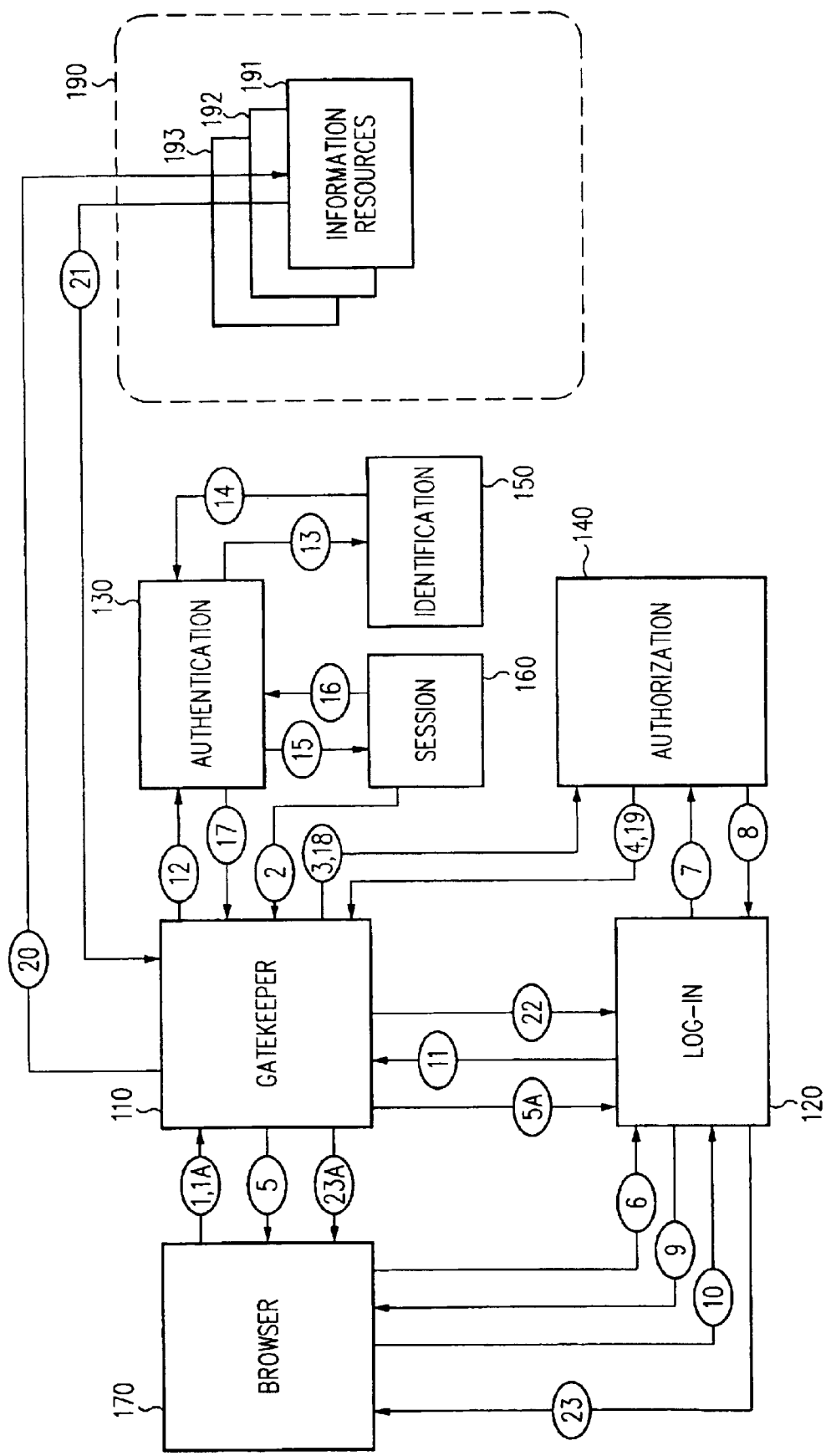
FIG. 1 is a block diagram illustrating information flows between components in a security architecture providing credential level change in accordance with an exemplary embodiment of the present invention.

Some terminology used in this specification has meaning particular to the context of embodiments described herein. Therefore, to aid persons of ordinary skill in the art in understanding the full scope of the invention, some of that terminology is now defined.

Glossary

Access Management: Systems, methods and techniques for controlling use of information resources. Typically, access management systems employ both authentication and authorization to control access to information resources.

Authentication: A process used to verify the identity of an entity. As typically implemented, an authentication method is employed to verify the identity of a user or object based on a credential supplied by the user or object.

Authorization: A process for determining whether an identity is permitted to perform some action, such as accessing a resource. Typically, an identity will be authenticated, though in some configurations certain identities need not be.

Credential: Evidence of identity used to authenticate an entity. Exemplary credentials types include passwords, certificates or other encrypted indicia based on asymmetric, symmetric, public, private, or secret key technologies, one-time passwords, biometric indicia such as by retinal scan, voice print, finger print, etc., and possession based indicia such as smart cards, Enigma cards, keys, etc. In some realizations, credentials may be associated with users, sessions, functional objects, etc.

Digital Signature: A transformation of a message using an asymmetric cryptosystem such that a person having the initial message and the signer's public key can accurately determine whether the transformation was created using the private key that corresponds to the signer's public key and whether the message has been altered since the transformation was made.

Entity: A user or object, including data objects and/or functional objects such as applications, components, modules, services, processes, threads, etc., as well as instantiations thereof. In some configurations, only user entities (typically, the human principal interacting with a software program or on whose behalf a software agent purports to act) are considered. In other configurations, entities include functional objects without an associated human principal. The identity of an entity may be authenticated using a credential.

Session: A period and collection of states spanning one or more interactions between an entity and an information environment. As used herein a session may span multiple interactions with multiple resources of the information environment and, in some configurations, may span multiple information access protocols (e.g., HTTP, FTP, telnet, etc.). A session has a beginning and an end. During its existence, a session has state. As used herein, the term session connotes a greater persistence than as sometimes used to describe the period of a "session layer" protocol interaction, which in the case of some protocols, such as HTTP, is generally very short-lived.

Single Sign-On Security Architecture

FIG. 1 provides an overview of major interactions between components for an exemplary security architecture in accordance with the present invention. As illustrated in FIG. 1, a client application, e.g., a browser 170 operated by a user, interacts with the security architecture via a gatekeeper and entry handler component 110 and a login component 120. Gatekeeper and entry handler component 110 provides an entry point for external client applications requesting access to enterprise applications and/or resources 190, including e.g., information resources 191, 192 . . . 193, for which access management is provided by the security architecture. Using facilities provided by a session management component 160, an authorization component 140, an authentication component 130, an identification component 150, and login component 120, the gatekeeper/entry handler component 110 allows, redirects or refuses access requests in accordance with a security policy.

Individual information resources typically have differing security requirements. In addition, individual types of access to a single information resource may have differing security requirements. Nonetheless, a given level of security may be sufficient for more than one of the information services or access types. For example, information resource 191 may include a product information service for providing general information such as product descriptions or data sheets to the public, while information resource 192 includes an order processing system for an eCommerce site. Information resource 193 may include functions for supply chain interactions such as access to inventory information or current selling price information. Both the product information service and order intake functions of the eCommerce may operate with similar security requirements, e.g., allowing access by minimally authenticated, non-hostile entities. On the other hand, supply chain functions may require a higher level of security. Order status functions of the order processing system may require a mid-level of security.

Login component 120, operating in conjunction with gatekeeper/entry handler component 110 and other components of the security architecture, provides a single sign-on interface for access to enterprise applications and/or resources 190. In an exemplary embodiment, security requirements are expressed in terms of trust levels and login component 120 obtains login credentials for an entity requesting access to one of the enterprise applications and/or resources 190. The login credentials obtained are selected from a set of credential types that, if authenticated, are sufficient to achieve the trust level requirement of an application or information resource to be accessed. Without limitation, typical login credential types and associated authentication mechanisms include those based on passwords, certificates, biometric techniques, smart cards, etc. Other credential types and associated authentication mechanisms are described elsewhere herein.

In some embodiments in accordance with the present invention, gatekeeper/entry handler component 110 queries authorization component 140 to obtain authorization for access to a particular requested enterprise application or information resource by the requesting entity (e.g., the browser user). If the entity requesting access has not yet been authenticated to the trust level required for the particular access to the particular enterprise application or information resource requested, authorization component 140 may indicate that the access request is to be redirected to login component 120 so that login credentials may be obtained and authenticated to a particular trust level. If, on the other hand, login credentials have already been obtained for the requesting entity and the requesting entity has been authenticated using the obtained credentials such that the required trust level has been achieved, the access will typically be allowed without the need for further login credentials and authentication. In certain circumstances, authorization component 140 may indicate that the access is to be refused. For example, authorization component 140 may be programmed to perform more stringent testing beyond a trust level requirement. In an exemplary enterprise tool configuration, a desired security policy may dictate that a salary tool is accessible only from with a company's internal network. No level of authenticated trust may be sufficient to access such a tool from outside company network. To facilitate implementation of such a security policy, authorization component 140 could refuse access based on environment parameters indicating a session originating outside the company's internal network.

Of note, in certain embodiments in accordance with the present invention, the mapping of login credential types and authentication mechanisms to trust levels is influenced by environment information such as time of request, source of request, connection speed, and/or client application (e.g., browser) environment information. In this way, even with a static set of mapping rules, the set of credential types and authentication mechanisms suitable to support a given trust level may vary based on environment information. In general, mapping rule dependencies are based on perceived variations in threat characteristics and/or requesting entity capabilities. In some embodiments in accordance with the present invention, gatekeeper/entry handler component 110 is the authority on environment information for a particular requesting entity.

In some embodiments, mapping rules may be dynamically varied. For example, if a particular login credential type and/or authentication method is deemed insecure (e.g., because compromised or because of a changing threat profile), the trust level mappings can be updated and have enterprise-wide effect. In addition, several other advantages are achieved by defining the authentication requirement interface between enterprise applications and/or resources and the security architecture in terms of required trust levels, rather than in terms of particular credential types and authentication methods. First, single sign-on configurations are facilitated using an enterprise-wide credential obtaining, authentication and session tracking infrastructure. Second, authentication requirements may be enforced uniformly in accordance with an enterprise-wide security policy and with reduced vulnerability to a lax security implementation by any particular information resource. Third, credential types and authentication methods can be added, deleted, or mapped to a new trust level, all without modification of enterprise applications and resources. Of course, all advantages need not be achieved in any particular implementation.

In certain embodiments in accordance with the present invention, a credential upgrade facility is provided. In response to an access request from an entity for which login credentials have already been obtained and authenticated, but for which the obtained and authenticated login credentials are insufficient for the trust level associated with the requested access, authorization component 140 may indicate that the access request is to be redirected to login component 120 so that sufficient login credentials may be obtained and authenticated to the required trust level. Of note, credential upgrade facilities in accordance with certain embodiments of the present invention allow upgrade without loss of session continuity.

Exemplary Configuration

Referring to FIG. 1, an entity (e.g., a browser 170 operated by a user) interacts with enterprise applications and/or resources 190 and the security architecture via a gatekeeper/entry handler component 110 and a login component 120. In general, a wide variety of entities, including human users operating browser and/or non-browser client applications as well as automated agents and systems, may interact with enterprise applications and/or resources 190 and the security architecture as described herein. Furthermore, a variety of information resource identification schemes, such as by Uniform Resource Locator (URL), resource address, identifier or namespace designation, may be employed. However, for purposes of illustration and not limitation, an exemplary interaction involving a browser and information resources identified by URL is described in detail. Nonetheless, based on the description herein, persons of ordinary skill in the art will appreciate a wide variety of configurations in accordance with the present invention in which non-browser clients, automated agents or other systems interact with enterprise applications and/or resources 190 and the security architecture using any of a variety of information resource identification schemes.

Focusing then on an exemplary browser-type client entity, browser 170 requests access to one or more of enterprise applications and/or resources 190 (e.g., information resource 191) by presenting an URL to gatekeeper/entry handler component 110, which acts as a point of entry for client entities requesting access to applications and/or resources controlled by the security architecture. Gatekeeper/entry handler component 110 receives the request as a proxy for the requested resource. In some configurations, a combined gatekeeper/entry handler instance is provided, while in others, separate and/or multiple instances are provided with functionally identical interfaces to other components of the security architecture. In some configurations, multiple instances of entry handler functionality (e.g., interception of inbound requests and collection of environment information) are provided. For example, one or more instances for each of several connection types (e.g., dialup, WAN, etc.) may be employed. One or more instances of gatekeeper functionality (e.g., allowing access for authorized requests and otherwise denying or initiating appropriate responsive action) may also be provided. Configurations and functional decompositions suitable to a particular environment and expected load requirements will be appreciated by persons of ordinary skill in the art.

Entry handler functionality (e.g., in gatekeeper/entry handler component 110) ascertains much of the requesting client's environment information. For example, for dial-up connections, environment information such as line speed and low-level line encryption are ascertained. Additional information, such as source number (e.g., from caller id information or based on a callback configuration), signaling type (e.g., POTS or digital ISDN), etc., may also be obtained. For network connections, similar environment information (e.g., source network and/or node, Virtual Private Network (VPN) low-level encryption, etc.) may be obtained from incoming requests themselves or based on a particular entry point (e.g., a particular router or port). More generally, gatekeeper/entry handler component 110 obtains and/or maintains information such as connect location (if ascertainable), temporal information such as request time/date, session start time/date, etc. (preferably in both the client entity's frame of reference and the security architecture or requested information resource's frame of reference, if location is ascertainable), and client type and/or capabilities (e.g., browser type and Java Development Kit (JDK) level). In some configurations, information on line speed, origination point (e.g., inside or outside of a corporate network), browser type, encryption capability, number of hops, latency, system type, etc. may be gathered. Such information is used in some configurations for mapping particular authentication mechanisms to trust levels and for authorization decisions. Environment information is generally packaged into a data structure that is associated with a client session. Other components of the security architecture may add additional client environment information, such as authentication strength or current trust level.

Gatekeeper functionality (e.g., in gatekeeper/entry handler component 110) checks whether a session is already associated with the incoming request. Although other techniques are possible, in some configurations in accordance with the present invention, gatekeeper/entry handler component 110 checks for the presence of a session token in the incoming request. Use of session tokens is described in greater detail below; however, in short, a session token may be any data supplied to the client entity for use in uniquely identifying an associated session. In general, preferred session token implementations are cryptographically secured and include facilities, such as expiration or mapping to a particular connection, to limit risk of replay attack and/or spoofing. Some session token implementations may encode session, principal, and/or trust level information. Some session token implementations may employ cookies, URL encoding, or other similar techniques for binding to incoming requests.

In some configurations, session tokens are employed to facilitate session continuity and to allow the security architecture to associate prior authentication of login credentials with an incoming access request. In one utilization, session tokens are issued to client entities as part of an interaction with the security architecture and are thereafter presented with access requests. In some configurations, new session tokens (each corresponding to a single session) are issued to client entity on each credential level change. In other configurations, a session token may remain the same even as credential levels are changed. Session continuity means the maintenance of coherent session state across one or more interactions between an entity and an information environment.

Components of session state (e.g., in some configurations, principal id, session id, authenticated trust level, group ids and/or roles, creation time, expiration time, etc.) are maintained or advanced throughout the duration of a session. Typically, aspects of session state are represented internally by the security architecture and a session token (e.g., a session id encoded in a cryptographically secured session token) allows the security architecture to reference into the internal representation. However, in some configurations, at least some aspects of session state may be represented or duplicated in the session token. For example, a principal id and current trust level are encoded in one realization of a cryptographically secured session credential and associated session token or cookie. In general, a variety of facilities, such as cookies, can be used to maintain state across a series of protocol interactions, such as HTTP transactions, that do not otherwise support persistent session state.

Referring again to FIG. 1, if a session token is present in the incoming request, gatekeeper/entry handler component 110 resolves the token to a session object. Alternatively, if no session token is present or if a session token is invalid, gatekeeper/entry handler component 110 establishes a new session (2). In an exemplary configuration in accordance with FIG. 1, session management component 160 allocates a new session and supplies associated default session credentials (2) based on the requested information resource and environment information. Note that a session is created irrespective of authentication status or identity, although some implementations may refuse to even allocate a session based on particular information resource requests and/or environment information. Given a session object, which may be resolved from a received session token or newly allocated, gatekeeper/entry handler component 110 interacts (3, 4) with authorization component 140 to determine whether the requested access is authorized. For some requested accesses and security policies (e.g., anonymous ftp access to certain archives), even a session without authenticated login credentials (trust level=0) may be authorized. For others, a more substantial trust level may be required.

Gatekeeper/entry handler component 110 supplies authorization component 140 with an identifier for the requested resource (e.g., the requested URL) and an identifier for the associated session. Preferably, the associated session identifier is cryptographically secured (e.g., as a signed session credential). In some configurations, the signed session credential is obtained from the corresponding session object. In the case of a pre-existing session, the signed session credential may be obtained using a received session token. In any case, authorization component 140 receives (3) the requested resource and session identifiers and responds (4) in accordance with the trust level requirement of the requested resource. In configurations for which sensitivity to a changing environment is desired, environment information may also be supplied to authorization component 140. In an exemplary configuration, authorization component 140 responds with an ALLOW, REDIRECT, or REFUSE response based on the sufficiency of a current trust level. In some configurations, authorization component 140 dynamically calculates a current trust level based on the signed session credentials and environment information. In others, authorization component 140 may base its ALLOW, REDIRECT, or REFUSE response on a "current" trust level previously associated with the signed session credentials. Generally, an access request with sufficient current trust level is ALLOWED and forwarded (14) without further authentication. An authorization request without proper parameters (e.g., without a specified information resource or without a properly secured session credential) may be REFUSED. Authorization requests associated with a client entity that has been blacklisted or for a resource for which the associated client entity cannot be authenticated using any available method to achieve the required trust level may also be REFUSED. For example, a given security policy and associated trust level mappings may dictate a REFUSE response in response to an access request to a sensitive resource (such as financial data) by any client entity (even a browser supplying the digital certificate for the CFO, and therefore presumably operating on behalf of the CEO) if the access request is received over a dial-up line and originates from an unknown number or is received outside of working hours.

In general, there is an implicit, base level of environment inherent in an authenticated trust level; however, in some configurations, a particular authorization transaction may dig deeper into environment information before responding. For example, in configurations providing log-up capabilities, an authorization service will typically redirect to a login service if the trust level associated with current session credentials is insufficient for a requested access. However, for sensitive applications in such a configuration, an inadequate trust level may result in a REFUSED message rather than a log-up REDIRECT depending on the particular security policy implemented.

A REDIRECT response is used to forward the access request to login component 120 so that sufficient login credentials may be obtained and authenticated to achieve the required trust level for the requested access. Note that in some configurations, both initial login credentialing and credential upgrade are provided using the REDIRECT facility. In response to a REDIRECT response (4), gatekeeper/entry handler component 110 redirects (5) browser 170 to login component 120. In one configuration, gatekeeper/entry handler component 110 issues a client-side redirect via HTTP location directive to forward the request to login component 120. Parameters such as required trust level, requested URL and credential passing method can be encoded in the redirect URL and supplied (6) by browser 170 to login component 120. Alternatively, some parameters can be passed (5A) directly (e.g., through a HttpSession object) although a stateless configuration is preferred.

A session token is passed to browser 170 in conjunction with the redirect (5) to login component 120. Based on the description herein, persons of ordinary skill in the art will appreciate a number of suitable mechanisms for passing the session token, including those based on cookies and URL encoding. Preferably, mechanisms employed are based on facilities provided by commercially available browsers (e.g., in accordance with HTML 3.x, 4.x or other de-facto standards), although customized or plug-in facilities for receiving and supplying session token may be employed. In one suitable configuration, the session token is cryptographically secured and encoded in a cookie placed at browser 170 using a set cookie directive embedded in the redirect. Other configurations may use a less persistent session identification method, such as passing an identifier or session token in the redirect URL without storage at browser 170. Still other configurations may transmit a session token, a session credential, or identifier such as a session handle for storage in a medium such as a smart card. In configurations providing credential upgrade, persistent session identification methods are generally preferred, even for a not yet authenticated client entity, for consistency of approach. Note that although the identity of the client entity may not be authenticated to a sufficient level of trust, the redirected request includes a session token that at least identifies the session. Other configurations may omit the binding of session tokens to sessions of not yet authenticated client entities, though with some increase in complexity of login component 120.

Browser 170 sends (6) login component 120 a new access request using the URL specified in the redirect from gatekeeper/entry handler component 110. In configurations employing cookies as a medium for passing session tokens, the new access request will include the cookie and therefore the session token. Note that in configurations in which the security architecture controls access to resources in several domains, care should be exercised to select a tag or tags for the cookie such that it will be provided through normal operation of the browser in subsequent accesses to any of the several domains. Persons of ordinary skill in the art will appreciate suitable tagging techniques, including the use of multiple cookies. Login component 120 receives the access request and determines an appropriate authentication scheme based on mapping rules that identify those authentication schemes which are sufficient to achieve a given trust level. Preferably, the mapping rules are a function of environment information. In some configurations, mapping rules are implemented as fuzzy sets wherein acceptable authentication schemes are a function of required trust level and environment information. In this way, environment affects the set of authentication schemes sufficient to meet a trust level requirement.

Generally, mapping rule logic is evaluated before a user is challenged to authenticate. Mapping occurs as a function of session environment and particulars of the information resource for which access is requested. By evaluating the minimum trust level required by the target of an access request, a service (e.g., a login service such as provided by login component 120) derives a list of potential authentication methods. The service then checks current session environment against the allowed environment states for each potential authentication method to trim the list further. If there is no particular resource for which access is being requested (e.g., if a user jumps straight to a sign-on page without requesting an access), the service will proceed according to the lowest level of trust available consistent with session environment. Other configurations may employ differing default behaviors.

In some configurations, login component 120 queries (7) authorization component 140 to identify the set of authentication schemes that meet or exceed the required trust level given a current environment. In other configurations, the mapping is performed by login component 120. In either case, login component 120 supplies (9) information to browser 170 to allow the user to select from the suitable authentication schemes and to provide an associated login credential. In some configurations, login component 120 supplies browser 170 with a login page (e.g., HTML) that prompts the user for an application specific user ID and a choice of authentication schemes. Interactions with browser 170 depend on the set of credential types that, if authenticated, would be sufficient to meet the trust level requirement for access to the requested resource. For example, if more than one type of credential would be sufficient, login component 120 may interactively allow a user to select from amongst the credential types (e.g., using any HTML-based dialog). Once a particular credential type has been selected, login component 120 interacts with browser 170 to obtain an instance of the login credential to establish the identity of the browser user.

Some credential types (e.g., username/password pairs, onetime passwords, enigma challenge, etc) may be obtained through an interactive process in which the user supplies the login credential(s) entry into an HTML form browser 170 POSTs form contents back to login component 120. Others (e.g., digital certificates) may be supplied (10) for the client entity from browser 170, or in some configurations, may be obtained from or via an agent or certificate authority. A personal digital certificate (such as those issued by Verisign™, Thwate, Entrust or other certificate authority) may be obtained from a browser 170 using an HTTP certificate request. Although credentials may be transacted in a variety of ways, credentials are typically obtained from a user. Typically, the obtaining is indirect by asking the user's browser to complete the negotiation process. In such configurations, certificate-based authentication may be transparent to the user. In some configurations, further authentication can be performed by using information encoded within the certificate to query a certificate authority for current status or a lookup to an authentication database may be performed for more detailed requirements. In an exemplary configuration, the more detailed information could relate to session environment or could force an additional name/password authentication as part of the certificate authentication chain. In a particular implementation such facilities can be provided by mapping rule encodings that require successful authentication using multiple authentication methods to achieve a given trust level.

Once login credentials have been obtained by login component 120, they are supplied (11) to gatekeeper/entry handler component 110 for authentication. In configurations in which both gatekeeper/entry handler component 110 and login component 120 have access to a shared object such as the HttpSession object, login credential passing via the shared object is suitable. In other configurations, an HTTP POST may be employed. In an exemplary configuration, the particular credential passing method is selected as part of the original HTTP redirect (e.g., encoded in the redirect URL) although other configurations need not allow for a selection or may employ other facilities for selection of a credential passing method.

Login component 120 also passes control of the access request back to gatekeeper/entry handler component 110. In an exemplary configuration, login component 120 issues a new HTTP request (11) specifying the originally requested URL, which has been stored in the HttpSession object. As before, gatekeeper/entry handler component 110 receives the request. Gatekeeper/entry handler component 110 extracts the login credentials from the request or from the HttpSession object and passes (12) the login credentials to authentication component 130 for authentication. Authentication component 130 authenticates the login credential, and if successful, queries (13) identification component 150 to establish a correspondence with a set of entity descriptors that uniquely identifies the requesting entity. In an exemplary configuration, entity descriptor types include: entity id, system id (e.g., name/password), certificate, enigma id, smartcard token, name/address, and phone. One or more of values may uniquely identify an entity and one or more entity descriptor types may support multiple values (e.g., multiple digital certificates, name/password pairs, or phone numbers per identity). Once the requesting entity has been identified (14), session parameters are updated (15) and session management component 160 supplies (16) session credentials. Preferably, session credentials are digitally-signed or otherwise cryptographically secured and returned (17) to gatekeeper/entry handler component 110.

Gatekeeper/entry handler component 110 again supplies (18) authorization component 140 with an identifier for the requested resource (e.g., the requested URL) and an identifier for the associated session (e.g., the signed session credentials. authorization component 140 responds with an ALLOW, REDIRECT, or REFUSE response based on the sufficiency the session credentials (and underlying authentication of login credentials) for the trust level required for the requested access. Login credentials should now be sufficient for access to the requested resource and an ALLOW response is supplied (19) by authorization component 140. Gatekeeper/entry handler component 110 proxies the requested access (20, 21) to information resource 191 and streams (22) results back to login component 120. Login component 120, in turn, streams (23) results back to browser 170.

In some embodiments in accordance with the present invention, session continuity is facilitated by supplying a session token to browser 170. For example in one configuration, login component 120 supplies a session token using a set cookie directive encoded with the results streamed (23) back to browser 170. In response, browser 170 stores the cookie using a tag (typically a filename encoding). Browser 170 supplies the cookie (and the session token) with subsequent access requests based on a correspondence between the tag and the requested resource. Typically, the correspondence is based on the second-level domain (e.g., sun.com) in which the requested resource is hosted, although nth-level domains or other resource identification and session token associating schemes may be employed. In configurations in which the security architecture controls access to multiple domains across which a spanning single sign-on is desired, multiple cookies may be employed.

Although the encoding of session tokens using cookies is presently preferred, in part because cookie facilities are widely supported and reasonably well accepted, other facilities may be employed to establish session continuity. For example, alternative URL encodings and/or custom or plug-in support for session identifier receipt, storage and supply may be employed. Also, some configurations may employ lower-level session identifiers, e.g., as provided by a particular connection type such as trusted caller id information or as associated with a low-level line encryption or virtual private network infrastructure. As such facilities are likely to be connection-type specific, it is envisioned that they may be used in conjunction with other session identifier facilities described above, e.g., session tokens encoded in cookies. In one configuration, the unique Ethernet MAC address associated with a network interface card may be employed as a session handle. The MAC address is then used to associate with a particular set of session credentials maintained by a central authority. In general the representation of a session handle can take may forms.

Referring again to FIG. 1, subsequent access requests (e.g., access request 1A) include a previously assigned session token. As described above, gatekeeper/entry handler component 110 uses the session token, if provided to resolve a session object containing session credentials, and to determine whether previously authenticated credentials are sufficient for the requested access. As described above, authorization component 140 may be queried using session credentials and an identifier for the requested resource to determine sufficiency of previously authenticated credentials. In some configurations, sufficiency is determined using trust level mappings as described above. Depending on the information resource to which access is requested, and in some configurations depending on current session environment information, access request 1A may or may not have associated previously authenticated credentials sufficient to support the requested access. In the case of an access request 1A having a trust level requirement commensurate with previously obtained and authenticated credentials (i.e., an access request for which no additional credentials need be obtained via login component 120), the access request is proxied (20) and results (21) are streamed directly (23A) back to browser 170. In some configurations, gatekeeper/entry handler component 110 supplies an updated session token using a set cookie directive encoded with the results streamed (23A) back to browser 170. An updated session token, if supplied, resolves to the same session object as the session token replaced. For example, in some configurations, both session tokens encode a same session handle, although other aspects associated with session token security such as expiration may be updated. In other configurations, results (21) are streamed (23A) back to browser 170 without an updated session token. In such configurations, the previously supplied session token remains valid until expired or otherwise invalidated. Some variations may employ a session token refresh interval.

Depending on the information resource to which access is requested, previously obtained and authenticated login credentials may be insufficient for the trust level requirement associated with requested access 1A. As before, authorization component 140 supplies gatekeeper/entry handler component 110 with an ALLOW, REDIRECT or REFUSE response based on the trust level accorded based on the previously obtained and authenticated login credentials and on the trust level requirement associated with requested access 1A. Advantageously, authorization of individual access requests is streamlined by the encoding of trust level in a cryptographically secured session credential or token. In the case of insufficient credentials, a REDIRECT response is supplied and gatekeeper/entry handler component 110 again redirects (5) browser 170 to login component 120. Additional login credentials are obtained as described above with reference to initial credentials. Upon successful authentication, access request is proxied (20) and results (21) are streamed (23A) back to browser 170.

Preferably, gatekeeper/entry handler component 110 supplies an updated session token using a set cookie directive encoded with the results streamed (23A) back to browser 170. An updated session token, if supplied, resolves to the same session object as the session token replaced. As a result, session state (including e.g., identity mappings, authorizations, roles, permissions, environmental variables, etc.) is maintained through the credential level change. However, in the case of a credential upgrade, the session object now encodes a login credential successfully authenticated to achieve a higher trust level. In one advantageous configuration, the achieved (higher) trust level is encoded in a cryptographically secured session token representation as a cookie streamed (23A) back to browser 170 with results (21).

Figure 2:
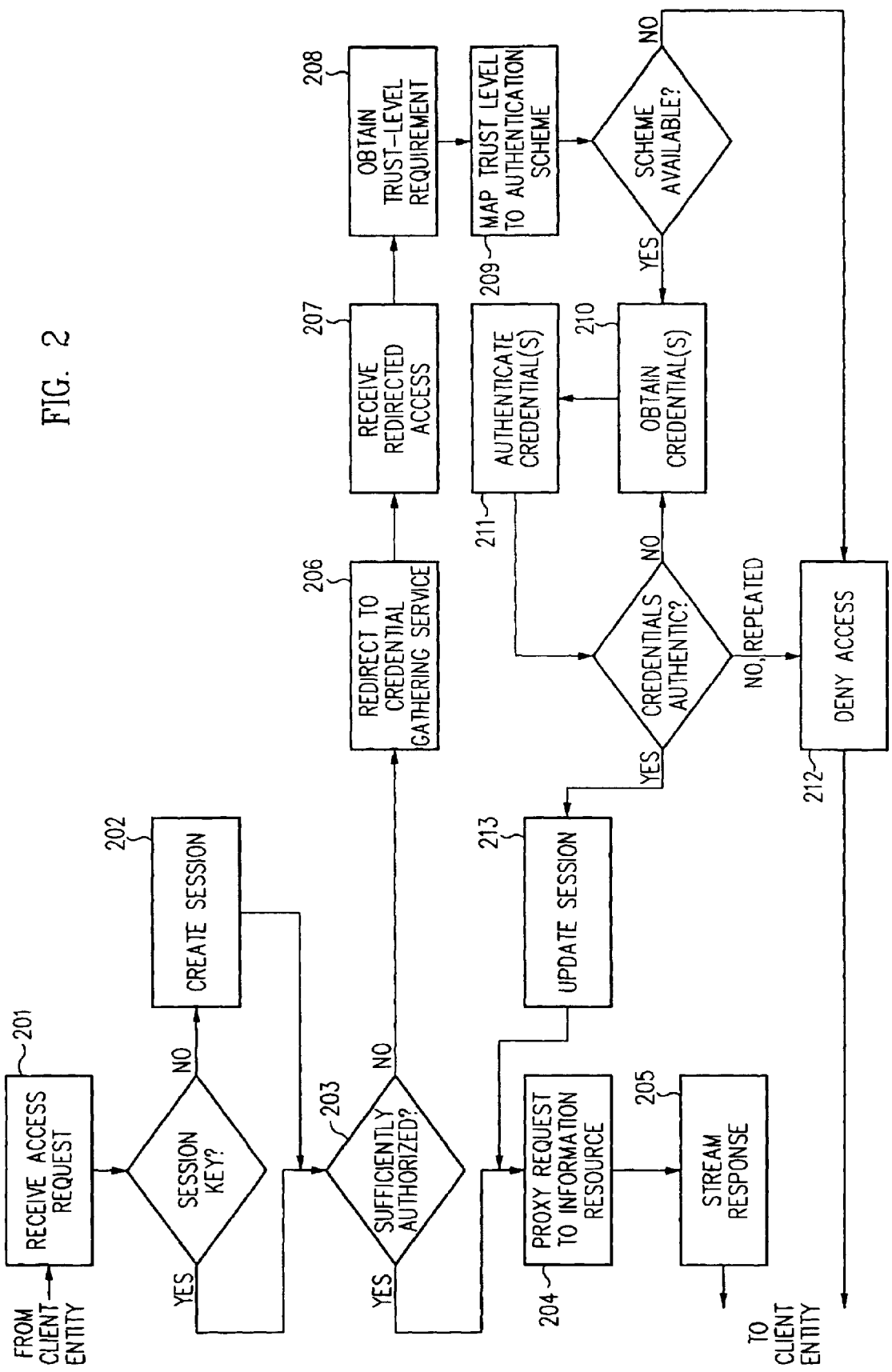
FIG. 2 is a flow chart illustrating operation of a security architecture providing credential level change in accordance with an exemplary embodiment of the present invention.
Figure 3A:
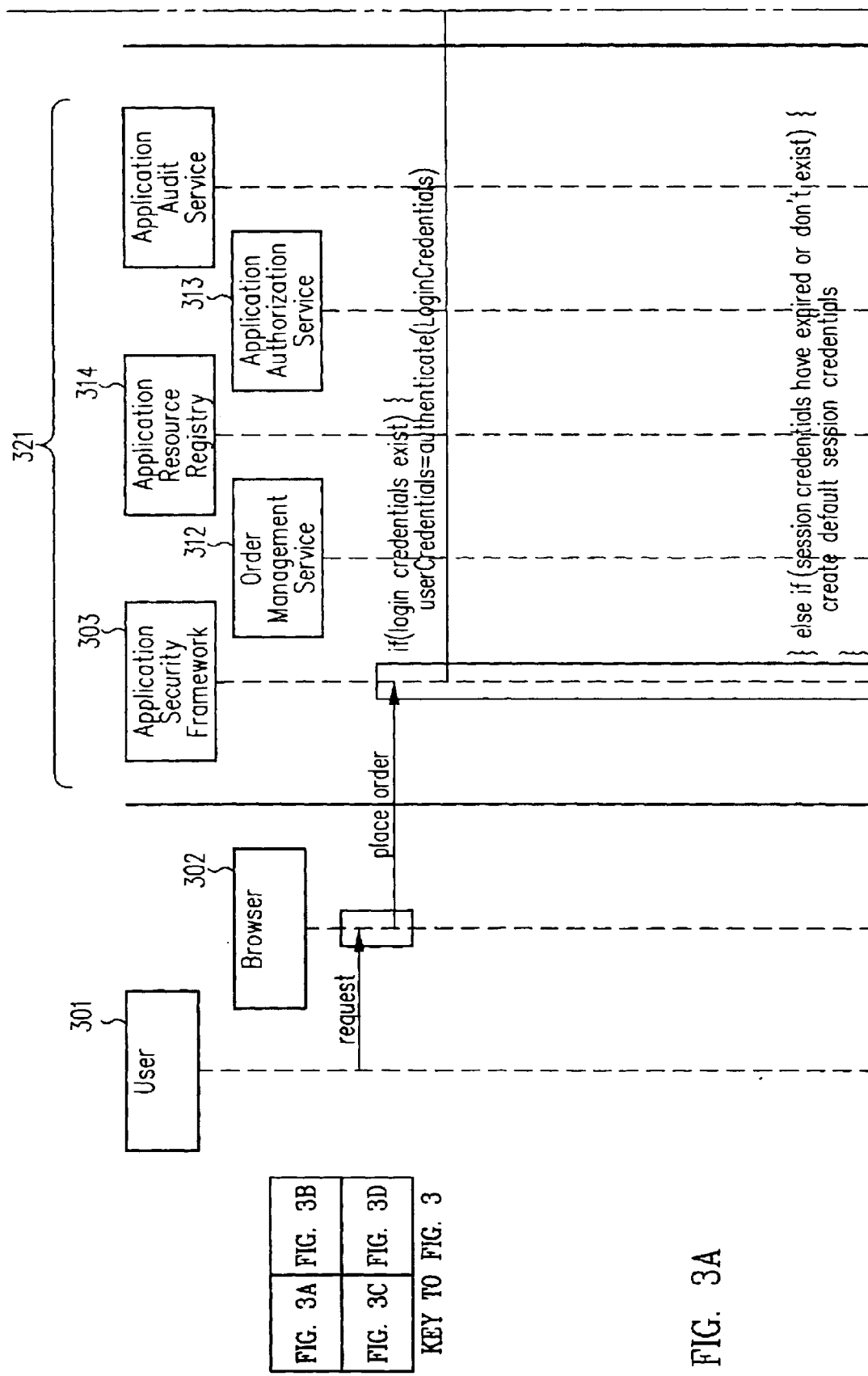
FIG. 3 illustrates interactions between functional components in a functional decomposition of a security architecture providing credential level change in accordance with an exemplary embodiment of the present invention.
Figure 3B:
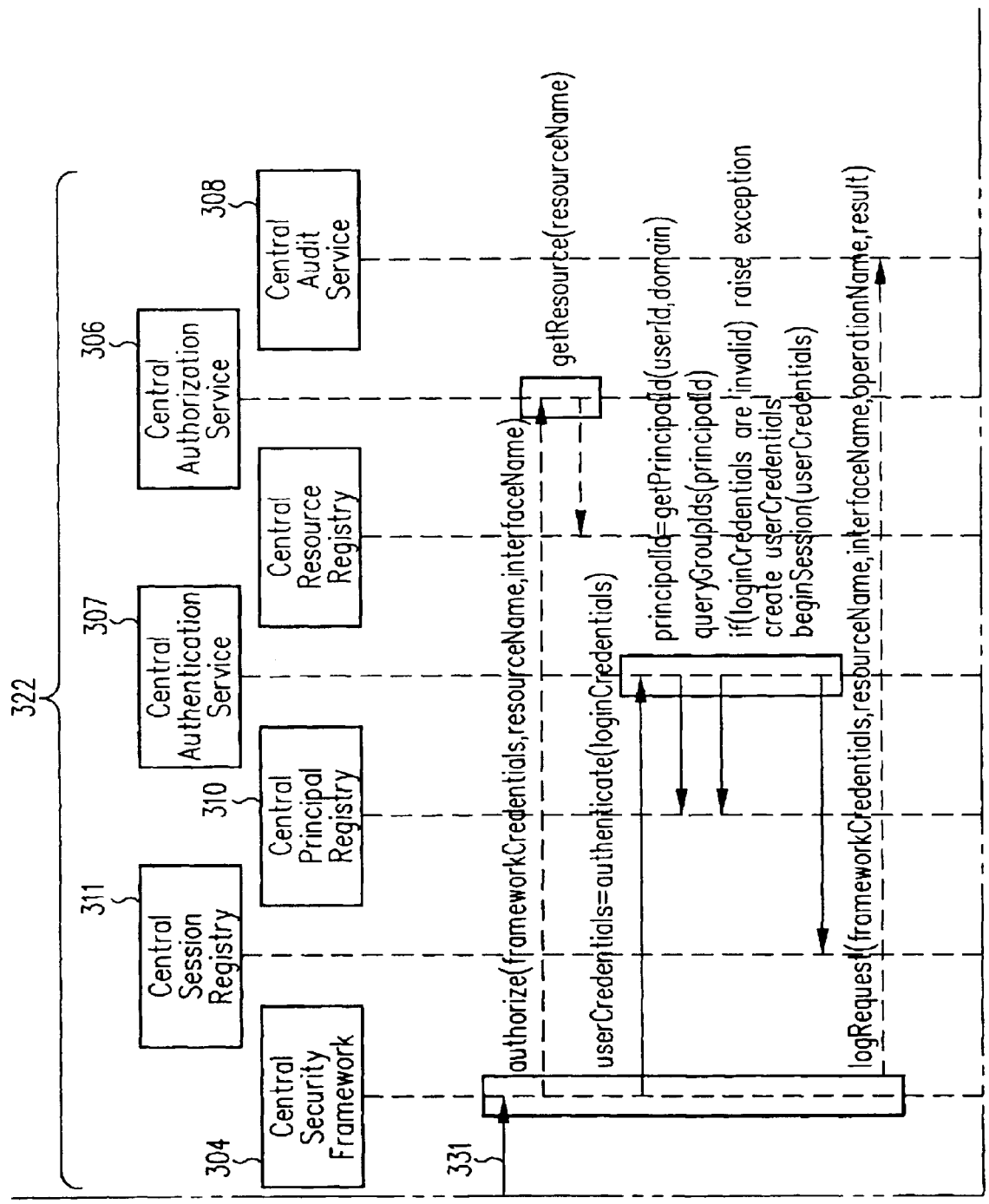
Figure 3C:
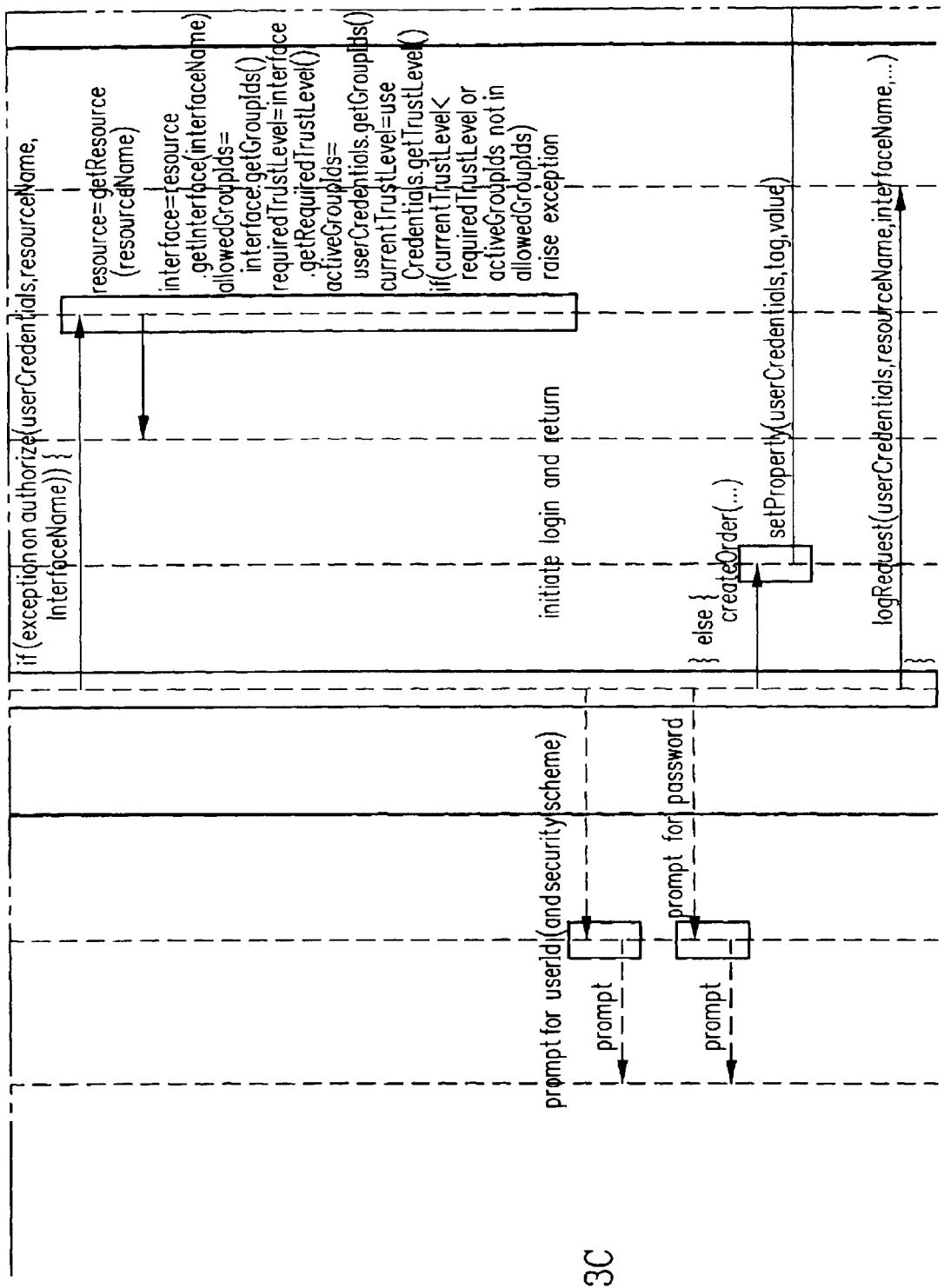
Figure 3D:
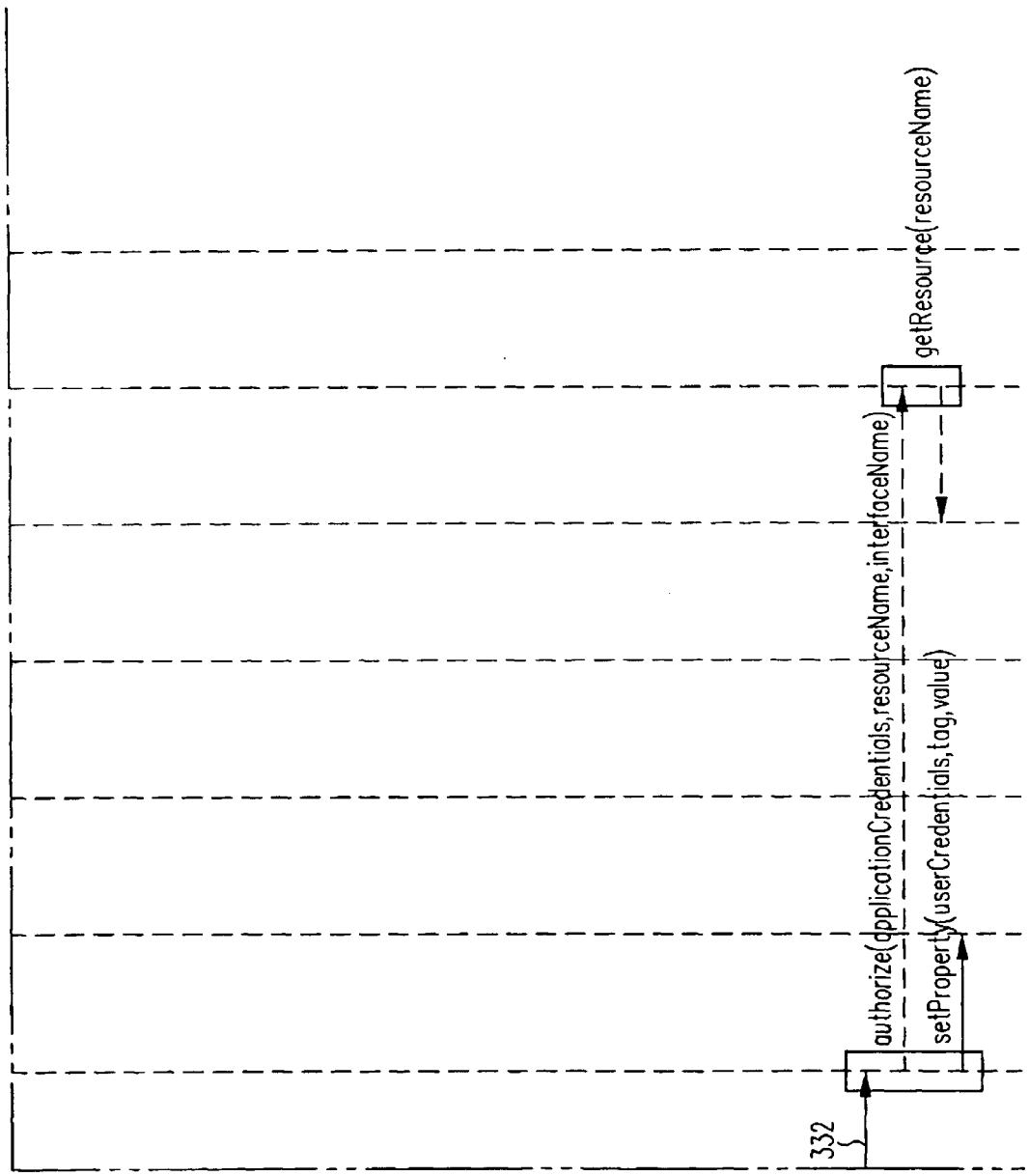

FIG. 2 illustrates operation of an exemplary security architecture providing a single sign-on facility with trust level mapping to authentication requirements. As before, an access request is received (201) from a client entity. If the request does not contain a session identifier (e.g., a session key or token) or if the request can otherwise be reliably associated with a session maintained by the security architecture, a new session is created (202). A trust level requirement is determined for access to the requested resource in the context of the requesting session environment. In some configurations, as described above, the determination is performed by an authorization service such as authorization component 140. Given a trust level requirement, current session credentials are evaluated (203) in the context of session environment information to determine whether the previously supplied login credentials are sufficient to achieve the required trust level. In one advantageous realization of session credentials and tokens, a cryptographically secured encoding of trust level allows authorization to be confirmed without involvement of an authentication service (e.g., with reauthentication of login credentials). In the case of a newly created (202) session, the authorization evidenced by session credentials will typically be insufficient, although some security policies may allow anonymous access to certain resources.

For a pre-existing session, i.e., for an access request that can be reliably associated with a persistent session by a cryptographically secured session token or otherwise, session credentials may or may not be sufficient for access to the currently requested resource. For example, after a first access, the identity of an entity accessing resources controlled by the security architecture will be authenticated to a trust level sufficient for that access. Depending on the trust level requirements of a subsequent access and, in some configurations, depending on then current trust level mapping rules and environment information, the level of trust associated with a current session (e.g., as evidenced by current session credentials) may or may not be sufficient for the subsequent access. In situations for which a current level of trust (e.g., resulting from prior authentication of login credentials for an entity associated with the session) is sufficient for later access to the same or to another information resource, access is allowed without additional authentication. For example, in some security architectures in accordance with the present invention, the security architecture proxies (204) the request to the requested information resource and streams (205) a resulting response back to the requesting client entity.

As described elsewhere herein, sufficiency of current session credentials is determined using mapping rules that, in some realizations, include environment information. In general, current session credentials may be insufficient (1) because the identity of the requesting client has not yet been authenticated (e.g., in a first access situation), (2) because of a higher trust level requirement for the requested access, or (3) because of a change in mapping rules or environment that causes a previously sufficient credential no longer be sufficient for a particular trust level. Whatever the reason for the insufficiency, a request corresponding to a session and client entity that is insufficiently authenticated, and that is therefore not authorized, is passed to a facility for obtaining credentials of a type that, if authenticated, will support the required trust level.

Figure 4:
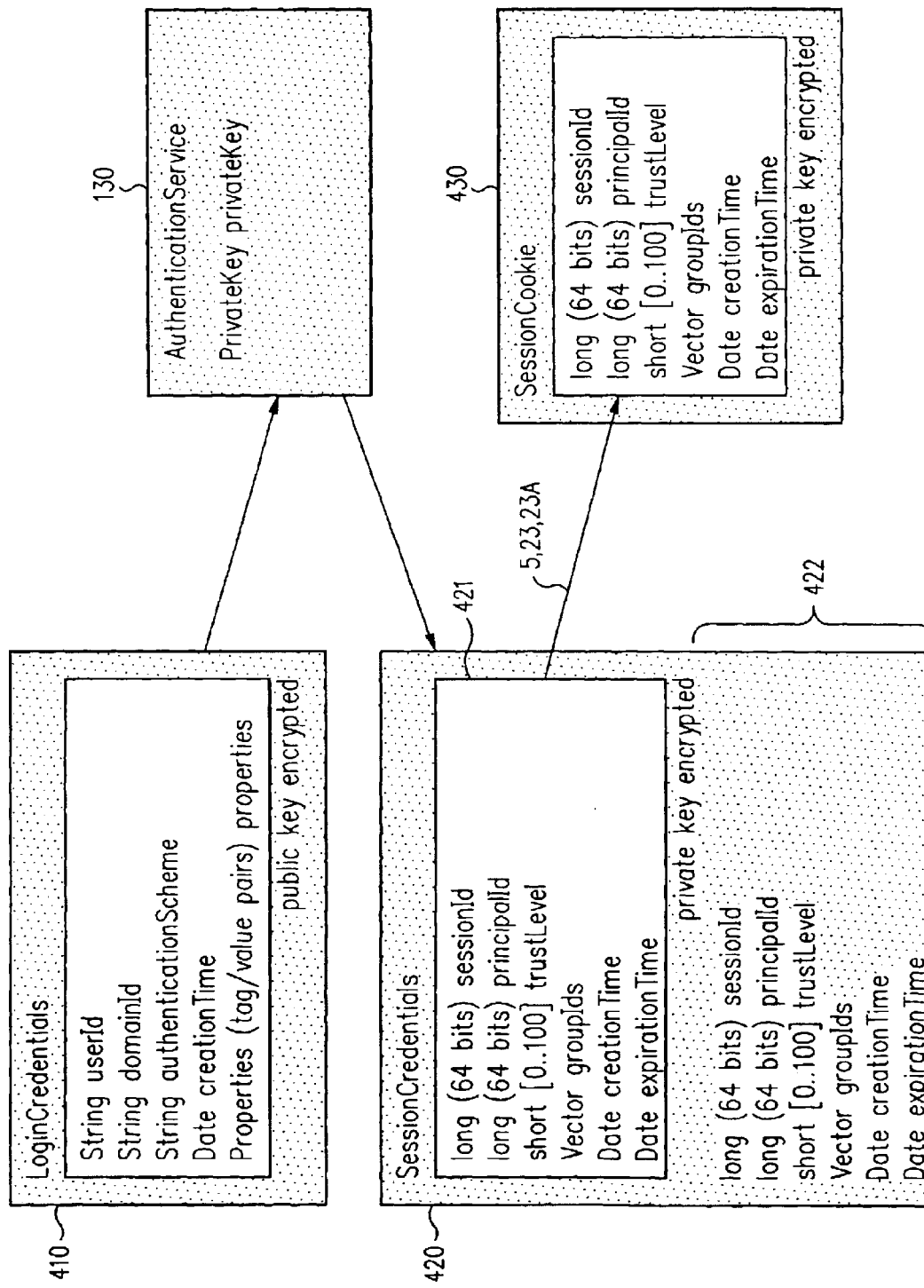
FIG. 4 illustrates relations between login credentials, session credentials and a cookie encoding of a session token in accordance with an exemplary embodiment of the present invention.

Typically, session credentials and/or an associated session token encode an expiration time (see description, below, of FIG. 4). In such configurations, a previously sufficient session credential is insufficient after its expiration. In some configurations, session credentials are periodically refreshed by reauthentication of the underlying login credentials. For example, in one implementation, a presented session token indicating expiration in less than five (5) minutes causes the security architecture to reauthenticate (not shown) underlying login credentials stored in a corresponding SessionObject (e.g., under the private key of authentication component 130). Reauthentication typically results in a new session credential and associated trust level. Depending on then instant mapping rules, the associated trust level may or may not be sufficient. Also, reauthentication may fail if the login credentials have been invalidated, revoked or if the login credentials have expired. Assuming that reauthentication of login credentials is successful, updated session credentials are issued, for example, by authentication component 130 and supplied (e.g., as a cookie encoded session token) to the client entity e.g., browser 170).

Referring again to FIG. 2, a request corresponding to a session not authorized for a requested access is redirected (206) to a credential gathering service (e.g., login component 120). The credential gathering service receives (207) the redirected access and obtains (208) a trust level requirement for the requested access. In some configurations, the trust level requirement may be passed with the redirected access or otherwise associated with the redirected access, in others the trust level requirement may be re-obtained from an authorization service such as authorization component 140. A trust level requirement is mapped (209) to at least one authentication scheme sufficient to achieve the requirement based on current trust level mappings and, if employed in the mapping rules, based on current environment information. Assuming that at least one authentication scheme is available that, if successful, will support the required trust level, login credentials of that type are obtained (210) for the entity and authenticated (211). Some credential types (e.g., username/password pairs, onetime passwords, enigma challenge, etc) may be obtained through an interactive process in which a principal (e.g., a human user) supplies the credential(s) entry in an HTML form and POSTs form contents back to the credential gathering service. Others (e.g., certificates) may be obtained for the client entity from an agent or authority. For example, a personal digital certificate (such as those issued by Verisign™, Thwate, Entrust or other certificate authority) may be obtained from a browser using an HTTP certificate request. In some configurations, a choice of credential types may be provided and user may select from a set of credential types sufficient for the requested access. Once appropriate login credentials have been obtained and authenticated, the session corresponding to the requested access is updated (213) to reflect the new authenticated session credentials. The now sufficiently authorized request is proxied (204) and results are streamed back (205) to the requesting client entity. Updated or refreshed session credentials are typically supplied as a session token (e.g., a cookie) encoded with the streamed results.

FIG. 3 illustrates interactions between functional components in an exemplary functional decomposition of a security architecture. An on-line order processing transaction is exemplary and functional boundaries are merely illustrative. Based on the description herein, a wide variety of suitable enterprise information environments and functional decompositions in accordance with the appended claims will be appreciated by persons of ordinary skill in the art.

In the configuration of FIG. 3, application and central security portions (321 and 322, respectively) of the security architecture are illustrated. Of note, functional components of application security portion 321 are typically hosed as services on a first server environment, while functional components of central security portion 322 are hosted as services on a second server environment. In this way, most interactions amongst functional components occur within a single server environment and do not require network transactions. In the configuration of FIG. 3, credentials associated with a calling component (e.g., framework credentials associated with application security framework 303 or application credentials associated with order management service 312) are used to establish sufficient authorization for network transactions. Other configurations may be employed, however, the relatively small number of network transactions (e.g., authentication transaction 331 and optional value passing transaction 332) tends to improve performance of the security architecture. Of note, authentication transaction 331 need only be performed on login credential authentication (e.g., at initial sign-on or credential upgrade) or reauthenticated (e.g., to refresh session credentials). Value passing transaction 332 provides an optional facility for passing values amongst multiple components of a distributed application (e.g., a distributed implementation of order management service 312) wherein application credentials are used to mediate storage and retrieval of values in a central registry.

User 301 interacts with browser 302 to place an order with order management service 312. An application security framework 303 receives an access request including the order and, operating in conjunction with a variety of other services, provides a single sign-on facility substantially as described above. If the order does not include a session token or cannot be otherwise associated with corresponding valid session credentials, then session credentials are obtained. As illustrated in FIG. 3, session credentials are obtained using login credentials (e.g., a username/password pair, a digital certificate, etc.) Typically, an access request without session credentials will not have associated login credentials. As a result, and default login credentials (e.g., identity=anonymous) are used during initial phases of a single sign-on process. Nonetheless, in some configurations, login credentials may be provided with an initial access request. More typically, an initial access request is received by application security framework 303 without session credentials or without prior presentation and authentication of login credentials sufficient to access the requested resource. In response to credential gathering operations, a subsequent request is made with login credentials that purport to be sufficient, if authenticated, to meet the trust level required for access to order management service 312. In such a case, session credentials are obtained by passing login credentials to a central security framework 304.

Authorization of application security framework 303 for access to components of the central security portion 322 is checked by query to central authorization service 306. Assuming that framework credentials evidence sufficient authorization, login credentials are authenticated by central authentication service 307. Central authentication service 307, in turn, interacts with central principal registry 310 to establish the identity and group membership of user 301 and with central session registry 311 to create a persistent session for subsequent accesses by user 301. Particulars of the request are logged to central audit service 308 and, if authentication was successful, session credentials are returned to application security framework 303.

Signed session credentials are presented to application authorization service 313 together with an identifier for the requested resource and optionally with an identifier for a particular function or facility of the requested resource. In response, application authorization service 313 checks the authorization of the principal (e.g., of user 301) associated with the session credentials to access the requested resource. Application authorization service 313 interacts with application resource registry 314 to identify trust level requirements for the requested resource (and in some configurations, for a particular function or facility of the requested resource) and determines the sufficiency of a current trust level evidenced by the session credential. Note that trust level is assessed by inspection of the session credential and without interaction with an authentication service. In some configurations (e.g., as illustrated in FIG. 3), group membership is also evaluated as part of the authorization check.

If the signed session credentials indicate that the requesting entity, e.g., browser 302 on behalf of user 301, is sufficiently authorized to access order management service 312, a CreateOrder request is passed to order management service 312 and order processing proceeds in accordance with normal handling thereof. Additional accesses may be required, e.g., to select delivery options or to confirm some aspect of the order. Assuming that the additional accesses do not require a higher trust level, they will be passed to order management service 312 based on the correspondence of session credentials with trust level requirements.

If an exception is thrown due to insufficient authorization, e.g., if the signed session credentials do not indicate that the requesting entity is sufficiently authorized to access order management service 312, a login credential gathering process is initiated. Based on the required trust level and on rules that encode the sufficiency of authentication schemes, a login credential is obtained from user 301 and/or browser 302. The obtained login credential is of a type that, if authenticated, is sufficient to meet the trust level requirement for access to order management service 312. Aspects of an exemplary credential gathering process are described in greater detail above. However, as an example, FIG. 3 illustrates the obtaining of a username/password pair. Once login credentials are obtained, they are passed to central security framework 304 (as described above) for authentication by central authentication service 307 so that session credentials can be obtained, the requested access can be authorized, and the order processing initiated. Signed session credentials, typically embodied as a cryptographically secured session token that may be stored as a cookie, are passed back to browser 302 with results of the requested access. In this way, subsequent access requests are identified as part of a session and authorization may be quickly confirmed without unnecessary re-authentication.

Some configurations in accordance with the present invention employ session credentials as a mechanism for evidencing prior authentication of obtained login credentials and for binding individual transactions to a particular session. In some configurations, session credentials are also employed in a session token form advantageous for transactions external to the security architecture. In an exemplary realization, session tokens are encoded for supply to browsers as cookies. FIG. 4 illustrates relationships between exemplary login credential, session credential and session token objects.

As described above, login credentials (e.g., represented in a form such as exemplary login credentials structure 410) are obtained for a client entity. Typically, login credentials encoded in login credentials structure 410 are obtained from a principal via browser client and serve as evidence that the principal (e.g., a human user) is entitled to a particular identity. Accordingly, login credentials structure 410 encodes a userId and a domainId within which the userId should uniquely correspond to a principal. Specific login credentials, e.g., a password, a certificate, results of a biometric process, a response to an Enigma challenge or results of a smart card interrogation, etc. are encoded in login credentials structure 410, as a tagged value. An authenticationScheme is specified and creation time may be encoded to limit replay attacks. In the implementation of FIG. 4, login credentials structure 410 is encrypted using the public key of an authentication service (e.g., of authentication component 130). Because the key is public, any component, even untrusted components may encrypt login credentials for provision to authentication component 130, while only authentication component can decrypt the encrypted login credentials using its private key. In some configurations, secure transfer protocols, e.g., SSL, are employed to secure login credentials between a client entity such as browser 170 and the security architecture while encryption with a public key of an authentication service is performed within the security architecture, e.g., at login component 120. In other configurations, encryption with a public key of an authentication service may be performed at the client entity.

If the encrypted login credentials provided to an authentication service are determined to be authentic, session credentials are issued. In the implementation of FIG. 4, session credentials are embodied in a form such as exemplary session credentials structure 420. Encrypted and clear text portions (421 and 422) of session credentials structure 420 allow contents of the session credential to be read by anyone and changed by no one (except the authentication service possessing a private key). Contents of encrypted portion 421 correspond to that clear text portion 422 but are encrypted using the private key of the authentication service (e.g., of authentication component 130). Of note, principal ids, authorizations and other contents encoded in the session credential may be read by components of the security architecture, and in some embodiments by components external to the security architecture. Such components can verify the authenticity of information stored in clear text portion 422 using encrypted portion 421 and a public key corresponding to the private key of the authentication service. Of note, the information contained in a session credential is generally not sensitive. What is sensitive is the state of the information. Therefore, security architectures employing facilities described herein ensure that information contained in the session credential is provably constant once set by an authentication service. By using the public key of the authentication service, which will in general be freely available, together with the encrypted information, any application can read the information (e.g., in free text) and ascertain that the session credential was created by the authentication service and that the session credential has not been tampered with. Assuming that the authentication service's private key has not been compromised, tampering with the session credential will result in a decryption failure.

In an alternative implementation (not shown), session credentials may be digitally signed and verified by a public key corresponding to a private key. In such an alternative implementation, the digital signature also allows contents of the session credential to be read by anyone and changed by no one. For some configurations, the implementation of FIG. 4 is preferred because encrypted portion 421 can be used as an externally supplied session token. Such a session token representation is a compact representation of the session credential particularly appropriate for encoding as a cookie placed at a browser and returned with subsequent access requests.

Referring again to session credentials structure 420, a session id, a principal id, a trust level, group ids, a creation time and an expiration time are encoded in both in encrypted portion 421 and clear text portion 422. The session id is a unique identifier for a persistent session maintained by the security architecture. In implementations in which credential upgrade is provided or in which a session credential expiration and refresh is provided, multiple successively issued session credential instances may encode the same session id and correspond to the same persistent session. Principal id encodes an identifier for a principal to which the security architecture has resolved login credentials. For example, a login credential including a username jdoe and a password corresponding to jdoe may be resolved by the security architecture to a unique principal id associated with John. Q. Doe of the shipping and receiving department, having an employee badge number of 12345, etc.

In some embodiments, a trust level encodes the authorization level to which a principal has been authenticated. In such embodiments, the encoded trust level serves as a basis for evaluating whether a principal associated with the session credentials has been authenticated to a sufficient level for access to a requested resource. For example, a trust level of 5 may be sufficient for access to information resources having a trust level requirement of 5 or less. Trust levels offer an attractive decoupling of authorization levels and authentication methods as described elsewhere herein. However, in some embodiments, an authorization encoding may establish that a principal has been authenticated using a particular authentication mechanism. In either case, an authorization (e.g., encoded as a trust level) in a cryptographically secured session credential allows the security architecture to authorize accesses based on prior authentication of a login credential and without involvement of the authentication service.

Group ids can be used to grant or limit authorization scope based on group membership. Typically, session credentials serve as evidence of prior authentication and authorization for multiple accesses to information resources controlled by the security architecture. However, session credentials may be replaced on a login credential upgrade as described elsewhere herein. In addition, session credentials of limited temporal validity may be refreshed by periodic replacement. In the configuration of session credentials structure 420, creation time and expiration time allow the security architecture to improve resistance to replay attacks. Session credentials typically have a relatively short expiration time (e.g., 15 minutes from creation or less) and underlying login credentials will be reauthenticated prior to expiration of the session credential. Assuming that the underlying login credentials, which are stored under the public key of authentication component 130, remain valid,. authentication component 130 will issue a replacement cryptographically secured session credential (e.g., as session credentials structure 420). Depending on then current trust level mappings and, in some configurations, depending on then current environment parameters, the authorization accorded by the security architecture and encoded as a trust level may differ from that encoded in the session credential replaced. If a principal id or login credential has been revoked, reauthentication may fail and a user may be prompted to supply a sufficient login credentials as described elsewhere herein. Session id and principal id will typically remain the same for successive session credentials associated with a single persistent session.

As previously described, one advantage of the approach employed in session credentials structure 420 is that encrypted portion 421 may also be employed as a compact session token representation 430 of session credential for use as a cookie. In one embodiment in accordance with FIG. 4, encrypted portion 421 is a string encoded representation of approximately 200 characters which may be placed at a browser (e.g., via transfer 5, 23 or 23A of FIG. 1) using a set cookie directive.

Exemplary Implementations

In an exemplary embodiment, at least some of the above-described components are implemented as servlets executable in the context of a commercially-available web server environment. For example, the Java™ Embedded Server (JES) architecture with extensions for certificate handling, HyperText Transfer Protocol (HTTP), Simple Network Management Protocol (SNMP), Secure Sockets Layer (SSL), extensible Markup Language (XML) grammar processing and security Access Control List (ACL) support available from Sun Microsystems, Inc. is one suitable environment. Java and all Java-based marks and logos are trademarks or registered trademarks of Sun Microsystems, Inc. in the United States and other countries.

In general, the description herein is focused on aspects of a security architecture, rather than on peculiarities of a particular implementation environment. It is envisioned that security architectures in accordance with the teachings of the present invention may be implemented in the context of many commercially-available networked information service environments, including web server environments, as well as in custom environments and environments that in the future will be developed. However, to facilitate an understanding of broad concepts using a specific exemplary environment, and without limitation, the description herein may include terminology specific to the Java Embedded Server (JES) architecture. Nonetheless, based on this description, persons of ordinary skill in the art will appreciate implementations suitable for other environments. The scope of the invention, as defined by the claims that follow, is not limited to any specific implementation environment.

While the invention has been described with reference to various embodiments, it will be understood that these embodiments are illustrative and that the scope of the invention is not limited to them. Many variations, modifications, additions, and improvements are possible. For example, the set of authentication schemes described herein is illustrative and embodiments in accordance with the present invention may include others, including those that may be hereafter developed. If employed, rules mapping trust levels to authentication schemes may be encoded in a variety of ways depending on the particular implementation. In general, such mapping rules may be encoded as static or dynamic table associating trust level to authentication schemes. Alternatively, mapping rules may be encoded as predicates or in other declarative forms. Mapping rules may be encoded in a weighted logic or fuzzy set form. Additionally, particular mappings may depend environment information. Furthermore, evaluation of mapping rules may be performed in a variety of functional components such as an authorization service, a credential gathering service or a gatekeeper. Session continuity may be provided using cryptographically secure session tokens passed as cookies or by other mechanisms.

In some configurations, a session token is a compact encrypted representation of at least selected contents of a session credential. Other compact representations corresponding to a session credential may be employed. Alternatively, the same representation of session credentials may be employed both within the security architecture and outside the security architecture (e.g., at a browser or other client). Suitable contents of a session credential (and session token, if employed) will be appreciated by persons of ordinary skill in the art based on the description herein of specific examples.

More generally, plural instances may be provided for components described herein as a single instance. Finally, boundaries between various components, services, servlets, registries and frameworks are somewhat arbitrary, and particular operations are illustrated in the context of specific illustrative configurations. Other allocations of functionality are envisioned and may fall within the scope of claims that follow. Structures and functionality presented as discrete components in the exemplary embodiment(s) may be implemented as a combined structure or component. These and other variations, modifications, additions, and improvements may fall within the scope of the invention as defined in the claims that follow.

What is claimed is:

1. A method for providing credential level change in a security architecture, the method comprising:

obtaining a first credential for a client entity and authenticating the client entity thereby;

accessing a first of plural information resources;

if the client entity is sufficiently authenticated for access to a second of the information resources, accessing the second information resource; and otherwise, obtaining a second credential for the client entity and authenticating the client entity thereby, the second credential sufficiently authenticating the client entity for access to the second information resource; and thereafter accessing the second information resource, wherein the accesses to first and second information resources are performed within a persistent session context and wherein the second credential obtaining and client entity authenticating are performed without loss of session continuity.

2. A method as in claim 1, further comprising:

issuing the client entity at least one session token for identifying the persistent session context to the security architecture.

3. A method as in claim 1, further comprising:

issuing to the client entity at least first and second session tokens, the first token after the first credential authenticating and the second token after the second credential authenticating, wherein the first and second session tokens both correspond to the persistent session context.

4. A method as in claim 3, wherein the client entity includes a browser operated by a principal; and wherein the session token is cryptographically secured and encoded in cookie supplied to the browser.

5. A method as in claim 1, further comprising:
prior to the first credential obtaining, receiving a request from the client entity to access the first information resource; and
after the client entity authenticating by the first credential, issuing the client entity a session token for identifying the persistent session context to the security architecture.

6. A method as in claim 5,
wherein the access request receiving and the first information resource accessing are performed by a proxy.

7. A method as in claim 1, further comprising:
establishing the persistent session context prior to the first authenticating.

8. A method as in claim 1, further comprising:
before the authenticating by the second credential, accessing a third of the information resources,
the first credential sufficiently authenticating the client entity for access to the first and third information resources.

9. A method as in claim 1,
wherein, after the authenticating by the second credential, the client entity is sufficiently authenticated to access both the first and second information resources.

10. A method as in claim 1, embodied as a computer program product encoded by or transmitted in at least one computer readable medium selected from the set of a disk, tape or other magnetic, optical, or electronic storage medium and a network, wireline, wireless or other communications medium.

11. In a networked information environment having plural information resources with potentially differing authentication requirements, a method of providing a sign-on common to the information resources, the method comprising:
authenticating a client entity using a first credential;
issuing a session token corresponding to a session of the client entity;
allowing access using the session token to first and second, but not a third, of the information resources;
upgrading the session token after authenticating with a second credential; and
thereafter, without loss of session continuity, allowing access using the upgraded session token to the first, second and third information resources.

12. A method as in claim 11,
wherein the session token and the upgraded session token both resolve to a same session object, the same session object maintaining a consistent session state spanning the upgrading.

13. A method as in claim 11,
wherein the client entity includes a browser.

14. A method as in claim 11,
wherein the first and the second credentials are selected from a set including username password pairs, digital certificates, encrypted credentials based on asymmetric, symmetric, public, private, or secret key technologies, one-time passwords, biometric credentials based on retinal scan, voice print, or finger print, and possession based credentials embodied in smart cards, Enigma cards or keys;
the second credential corresponding to a higher trust level than the first.

15. A method as in claim 11, embodied as a computer program product encoded by or transmitted in at least one computer readable medium selected from the set of a disk, tape or other magnetic, optical, or electronic storage medium and a network, wireline, wireless or other communications medium.

16. In a networked information environment having plural authentication levels for access to one or more information resources, a method for providing a persistent session interface thereto, the method comprising:
authenticating an entity to a first authentication level and associating a unique session identifier with the entity;
after association of the unique session identifier, authenticating the entity to a second authentication level and maintaining the association of the unique session identifier with the entity; and
thereafter allowing access, using the unique session identifier, to the information resources at the second authentication level.

17. A method as in claim 16,
wherein the unique session identifier is encoded in one or more session tokens issued to the entity.

18. A method as in claim 16, further comprising:
after the authenticating to the first authentication level, accessing, using the unique session identifier, a first of the information resources at the first authentication level.

19. A method as in claim 18, further comprising:
after the authenticating to the second authentication level, accessing, using the unique session identifier, the first information resource at the second authentication level.

20. A method as in claim 16, further comprising:
after the authenticating to the second authentication level, accessing a second information resource at the second authentication level.

21. A method as in claim 16, embodied as a computer program product encoding instructions executable by a computer to perform the authenticating to first and second authentication levels and to perform the access allowing, the computer program product encoded by or transmitted in at least one computer readable medium selected from the set of a disk, tape or other magnetic, optical, or electronic storage medium and a network, wireline, wireless or other communications medium.

22. A secure information system comprising:
plural information resources hosted on one or more servers coupled via a communication network to a client entity, the plural information resources having individualized authentication requirements; and
a log-on service common to the plural information resources, the common log-on service obtaining a first credential for the client entity, authenticating the client entity thereby, and establishing a session having a first authentication level commensurate with authentication requirements of at least one of the plural information resources,
wherein, in response to an access request requiring a second authentication level higher than the first, the common log-on service obtains a second credential for the client entity, authenticates the client entity thereby, and upgrades the session to the second authentication level without loss of session continuity.

23. An access management system providing a single sign-on for sessions that potentially include access to plural information resources having differing security requirements, the access management system comprising:
a gatekeeper including an authorization interface for determining whether a first authenticated credential associated with client entity and session is consistent with a trust level requirement for a target information resource and, if so, proxying an access thereto; and means responsive to the gatekeeper for upgrading the session by obtaining and authenticating a second credential to allow access to the target information resource if the first authenticated credential is inconsistent with the trust level requirement, the session upgrade means maintaining session continuity across credential upgrades.

24. A computer program product encoded in computer readable media, the computer program product comprising:

log-on code executable on a first server as a log-on component to obtain one or more credentials for a client entity, the log-on component including an authentication interface for authenticating the client entity using the obtained one or more credentials; and gatekeeper code executable on one of the first server and a second server as a gatekeeper component to receive access requests from the client entity, the gatekeeper component including an authorization interface for determining whether an authentication level is consistent with a trust level requirement for a target information resource and, if so, proxying an access thereto, and, if not, redirecting the access to the log-on component for obtaining and authenticating at least one additional credential to allow access to the target information resource.

25. The computer program product of claim 24, further comprising:

authentication code executable as an authentication component to perform the authenticating; and authorization code executable as an authorization component to determining consistency of authentication levels with trust level requirements.

26. The computer program product of claim 24, encoded by or transmitted in at least one computer readable medium selected from the set of a disk, tape or other magnetic, optical, or electronic storage medium and a network, wireline, wireless or other communications medium.

* * * * *